United States Patent [19]

Hicks et al.

[11] 4,362,308
[45] Dec. 7, 1982

[54] COMBINATION PORTABLE CHAIR AND CONTAINER

[76] Inventors: James S. Hicks, P.O. Box 703, Sussex, N.J. 07461; Pasquale Massaro, 65 Hunter Rd., Lincoln Park, N.J. 07035

[21] Appl. No.: 223,405

[22] Filed: Jan. 8, 1981

[51] Int. Cl.³ .............................................. B62B 1/12
[52] U.S. Cl. ...................................... 280/30; 280/645
[58] Field of Search ................. 280/30, 289 R, 289 A, 280/202, 200, 78, 639, 652, 659, 38, 645, 654, 641, 651; 297/129

[56] References Cited

U.S. PATENT DOCUMENTS

| | | | |
|---|---|---|---|
| 1,429,966 | 9/1922 | Olsen | 280/645 |
| 2,789,829 | 4/1957 | Parker | 280/659 |
| 2,967,058 | 1/1961 | Hoffmann, Jr. | 280/30 |
| 3,758,128 | 9/1973 | Stenwall | 297/129 |
| 3,827,707 | 8/1974 | Bierman | 280/654 |
| 3,860,254 | 1/1975 | Wegener | 280/78 |
| 3,997,213 | 12/1976 | Smith et al. | 280/652 |

FOREIGN PATENT DOCUMENTS

| | | | |
|---|---|---|---|
| 577594 | 5/1946 | United Kingdom | 280/30 |
| 675640 | 7/1952 | United Kingdom | 297/129 |

Primary Examiner—Joseph F. Peters, Jr.
Assistant Examiner—Ross Weaver
Attorney, Agent, or Firm—Lerner, David, Littenberg & Samuel

[57] ABSTRACT

A multi-purpose assembly is constructed to be arranged from a compact folded position into a portable chair and container. The assembly includes a pair of sidewall members each having side arms pivotally connected at one end to opposite sides of a base. Telescoping assemblies are connected to the other ends of the side arms between common sides to secure the sidewall members in an upright position and to permit their rotation into a folded position overlying the base. The multi-purpose assembly is arranged into a portable chair and container from the compact folded position by rotating one or both of the sidewall members into the upright position. Movement of the multi-purpose assembly over loose terrain, such as sand and the like, is assisted by a ribbed roller secured adjacent to one side of the base.

18 Claims, 8 Drawing Figures

COMBINATION PORTABLE CHAIR AND CONTAINER

BACKGROUND OF THE INVENTION

This invention relates in general to a multi-purpose assembly, and more particularly, to a collapsible, multi-purpose assembly adapted for use with a flexible bag which is constructed to be arranged from a compact folded position into a portable chair and container.

Today, an increasing interest is being created in outdoor activities which are planned for one's personal enjoyment and relaxation. These activities often take the form of picnics and outings to the beach where seating is generally not available. This requires the use of portable seating devices such as foldable chairs and lounges. On such occasions, it may also be necessary to transport various items, such as coolers, blankets, radios, umbrellas and the like from one's automobile to the desired beach or picnic area. This further requires the use of a separate container for carrying these items, in addition to the portable seating device. The carrying of both the container and the portable seating device is generally both inconvenient and awkward.

In accordance with the prior art, there have been constructed a variety of combined seating and container devices for use on picnics and outings to the beach. These combined devices include a container for holding the above-mentioned items to be carried from one's automobile to the desired beach or picnic area. Upon arrival at the desired area, these items are removed from the container and the combined device can be arranged into the form of a chair or lounge. Typical of one prior art construction is U.S. Pat. No. 2,840,142 which discloses a foldable cart that can be transformed from a container into a reclining chair and bed. However, it has been found that these prior art devices are generally difficult and awkward to convert from one form to the other. Also, these prior art devices are generally of complex construction which makes them expensive to fabricate.

Accordingly, there is a need for a collapsible, multi-purpose assembly which can be easily arranged into a portable chair and container by the simple manipulation of the assembly and which is inexpensive to fabricate.

SUMMARY OF THE INVENTION

It is broadly an object of the present invention to provide a combination portable chair and container which overcomes or avoids one or more of the foregoing disadvantages from the use of the prior art combined devices. Specifically, it is within the contemplation of the present invention to provide a collapsible, multi-purpose assembly which can be formed from a compact position into the shape of a chair and container by the simple rotational movement of a portion of the assembly.

A further object of the present invention is to provide a collapsible, multi-purpose assembly which can be transported over loose terrain, such as sand and the like, with a minimum effort, particularly when arranged into a container and having a plurality of items stored therein.

A still further object of the present invention is to provide a collapsible, multi-purpose assembly which is light in weight, which is foldable to the approximate size of a conventional beach chair or lounge, and which is inexpensive to fabricate.

Yet still a further object of the present invention is to provide a collapsible, multi-purpose assembly which can be arranged from a portable chair and container into a compact folded position in a relatively simple and uncomplicated manner.

In accordance with one embodiment of the present invention, there is provided a collapsible, multi-purpose assembly. The assembly includes a base and a pair of sidewall members each having first and second ends. The first ends of the sidewall members are pivotally connected to opposite sides of the base. A pair of securing means are connected to the second ends of the sidewall members between common sides thereof. The securing means secure the sidewall members in a first position and permit the sidewall members to be arranged into a second and third position. The assembly forms a container when arranged in the first position, a chair when arranged in the second position and a collapsed assembly when arranged in the third position.

Further in accordance with the above embodiment, the collapsible, multi-purpose assembly includes rotating means adjacent to the base for moving the assembly over a desired terrain. The rotating means includes a plurality of longitudinally extending ribs arranged radially about the longitudinal axis of the rotating means.

Still further in accordance with the above embodiment, the collapsible, multi-purpose assembly is adapted for use with a flexible bag which is secured to the assembly, wherein the bag forms the sidewall portions of the container and the back and bottom portions of the chair.

BRIEF DESCRIPTION OF THE DRAWINGS

The above description as well as further objects features and advantages of the present invention will be more fully understood by reference to the following detailed description of a presently preferred, but nonetheless illustrative collapsible, multi-purpose assembly in accordance with the present invention when taken in conjunction with the accompanying drawings, wherein.

DETAILED DESCRIPTION

Figure 1:
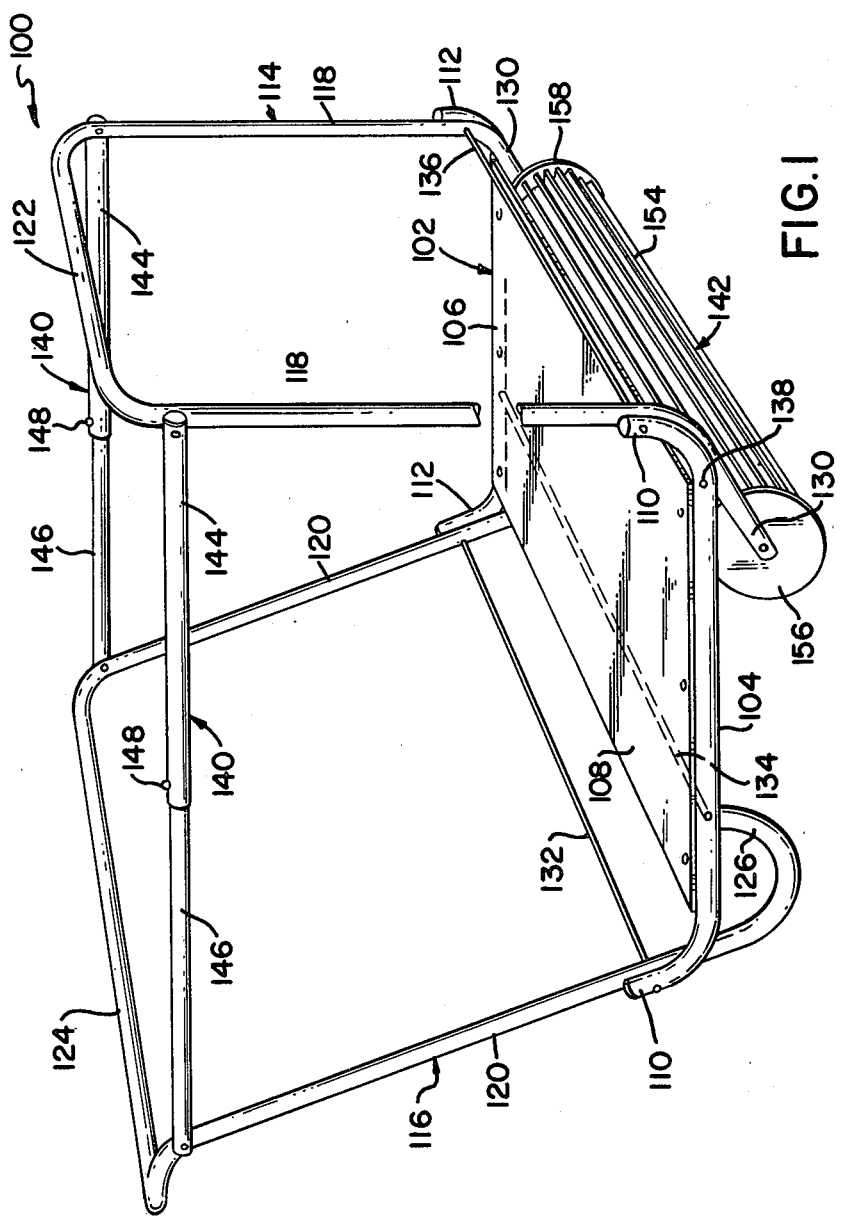
FIG. 1 is a perspective elevation of a collapsible, multi-purpose assembly constructed of tubular members showing sidewall members pivotally secured along opposite sides of its base and having securing means connected between the common side arms of the sidewall members.
Figures 7, 8:
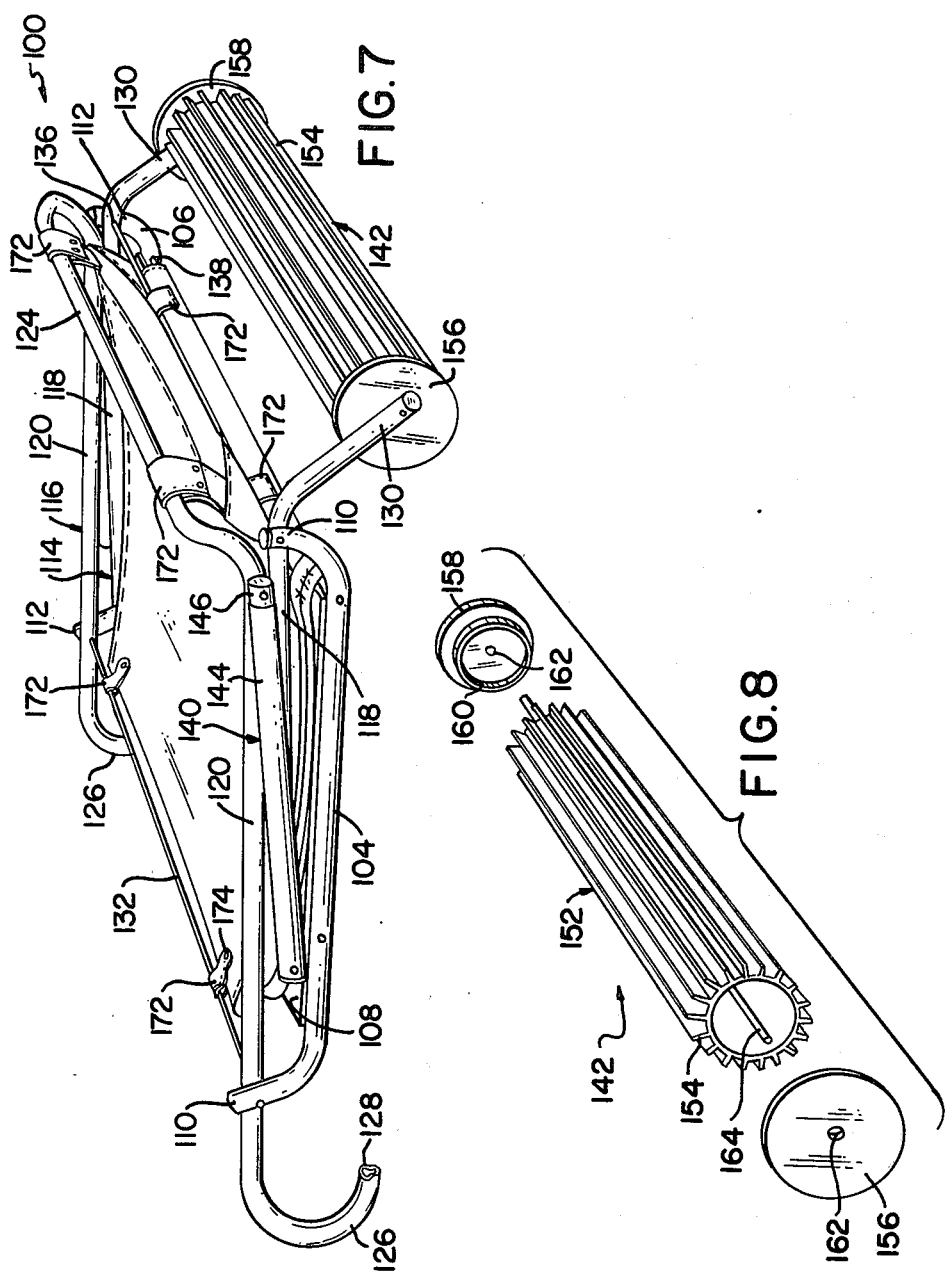
FIG. 7 is a perspective elevation of the collapsible, multi-purpose assembly as shown in FIG. 5 arranged in a compact folded position having its sidewall members overlying its base.
FIG. 8 is an exploded perspective elevation of a roller assembly used for transporting the multi-purpose assembly over loose terrain and showing the roller assembly housing a plurality of longitudinally extending ribs arranged radially about its longitudinal axis.

Referring specifically to the drawings, there is shown in FIG. 1, a collapsible, multi-purpose assembly constructed according to the present invention from tubular members and generally designated by reference numeral 100. The assembly 100 is constructed to include a base 102 having a pair of side supporting members 104, 106 and a platform 108. The side supporting members 104, 106 are provided with upwardly curved distal ends 110, 112. A pair of U-shaped sidewall members 114, 116 are formed of side arms 118, 120, respectively, and cross-members 122, 124 connected across one end of the side arms. As best shown in FIG. 7, side arms 120 are formed at their other end into a U-shaped hook 126 with a notch 128 and side arms 118 are formed at their other end into a straight end segment 130.

Figure 2:
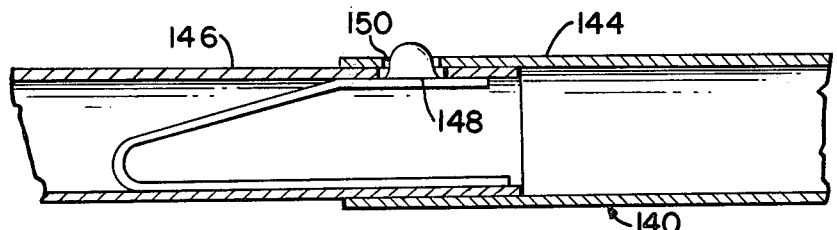
FIG. 2 is a cross-sectional elevation of a locking device for releasably locking the securing means in a longitudinally extended position.

The assembly 100 further includes a plurality of cross-shafts 132, 134, 136, 138, a pair of telescoping tube assemblies 140 and a roller assembly 142. As shown in FIG. 2, telescoping tube assemblies 140 include tubular members 144, 146 of different diameters. The internal diameter of tubular member 144 is slightly greater than the outside diameter of tubular member 146 such that tubular members 144, 146 are held in telescoping engagement with each other. A spring button lock 148 is arranged within the tubular members 144, 146 to engage an aligned opening 150 provided in the tubular members.

As shown in FIG. 8, roller assembly 142 includes a ribbed roller section 152 having a plurality of longitudinally extending ribs 154 positioned radially about its longitudinal axis. At either end of ribbed roller section 152 are end caps 156, 158 having a stepped shoulder 160 for engagement with the open end of the ribbed roller section. The outside diameter of end caps 156, 158 are slightly greater than the outside diameter of ribbed roller section 152. End caps 156, 158 include a centrally located hole 162 through which the ends of an axle 164 extend.

Figure 3:
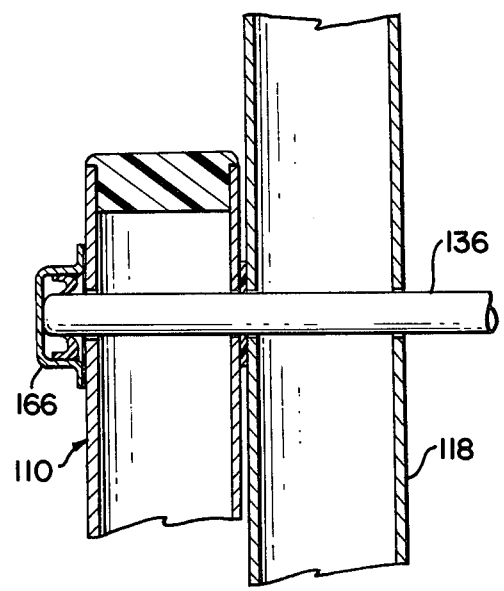
FIGS. 3 and 4 are cross sectional elevations of portions of the collapsible, multi-purpose assembly showing the pivotal connection between the tubular frame members of the assembly.

The operative arrangement of the above-mentioned components of the collapsible, multi-purpose assembly 100 will now be described generally with reference to FIG. 1. Side supporting members 104, 106 are secured to platform 108 using rivets, screws and the like such that distal ends 110, 112 are arranged in an upward position. Sidewall member 114 is pivotally connected at one end of its side arms 118 to distal ends 110, 112 via cross-shaft 136, as further shown in FIG. 3. Cross-shaft 136 is prevented from sliding out from distal end 110 by the use of a push on, self-locking retaining button 166. In a similar manner, sidewall member 116 is pivotally connected to distal ends 110, 112 via cross-shaft 132.

Cross-shaft 134 is secured between side supporting members 104, 106 for engagement with notch 128 provided at the end of U-shaped hooks 126 to restrict the extent of pivotal movement of side supporting member 116 in a counterclockwise direction. In a similar arrangement, cross-shaft 138 is secured between side supporting members 104, 106 to restrict the extent of pivotal movement of sidewall member 114 in a clockwise direction by engagement with a portion of straight end segments 130 of the side arms 118.

Figure 4:
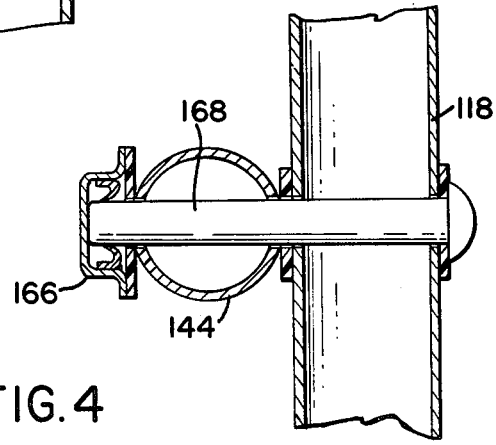

Telescoping tube assemblies 140 are pivotally connected to the upper ends of sidewall members 114, 116 between common side arms 118, 120. As shown in FIG. 4, tubular member 144 is pivotally connected to side arm 118 by pin 168 passing through both members and secured therein by a push on, self-locking retaining button 166. In a similar manner, tubular member 146 is pivotally connected to the upper end of side arm 120.

The roller assembly 142 is rotationally secured between straight end segments 130 of the side arms 118 by a push on, self-locking retaining button secured to either end of axle 164. The ends of ribbed roller section 152 are pressed onto the stepped shoulder 160 of end caps 156, 158 to permit the rotation of the roller section about axle 164.

The collapsible, multi-purpose assembly 100 is adapted for use with a flexible web or bag 170. Bag 170 is constructed from a plyable fabric and is secured to assembly 100 by eight constraining flaps 172. The top four constraining flaps 172 loop over cross-members 122, 124. Snaps 174 are provided on constraining flaps 172 for closing the flaps back on themselves. The lower four constraining flaps 172 overlay cross-shafts 132, 136 and are similarly provided with snaps 174 for closing the flaps back on themselves. The top perimeter of bag 170 has sewn into the hem an elastic strip. The elastic strip is designed to facilitate a neat appearance when the assembly 100 is in a folded position.

There has thus far been described according to the present invention, a collapsible, multi-purpose assembly for use as a portable chair and container. The assembly 100, when in its folded position, is of the approximate size and weight of a standard folding lounge or beach chair which can be suitably carried in the trunk of an automobile. Upon arrival at the beach or picnic area, the similarity with a folding lounge or beach chair ends. The assembly 100 can be opened in two quick motions and every item that previously was toted by hand is transferred into the assembly, such as coolers, blankets, radios, umbrellas and the like. At the beach or picnic area, the assembly 100 can be used to store unused items and to keep them out of sight and out of the sand contaminated environment. Once at the desired area, the items can be removed from the container, and the assembly 100 can be transformed into a comfortable portable chair as shown in FIG. 6.

Figure 5:
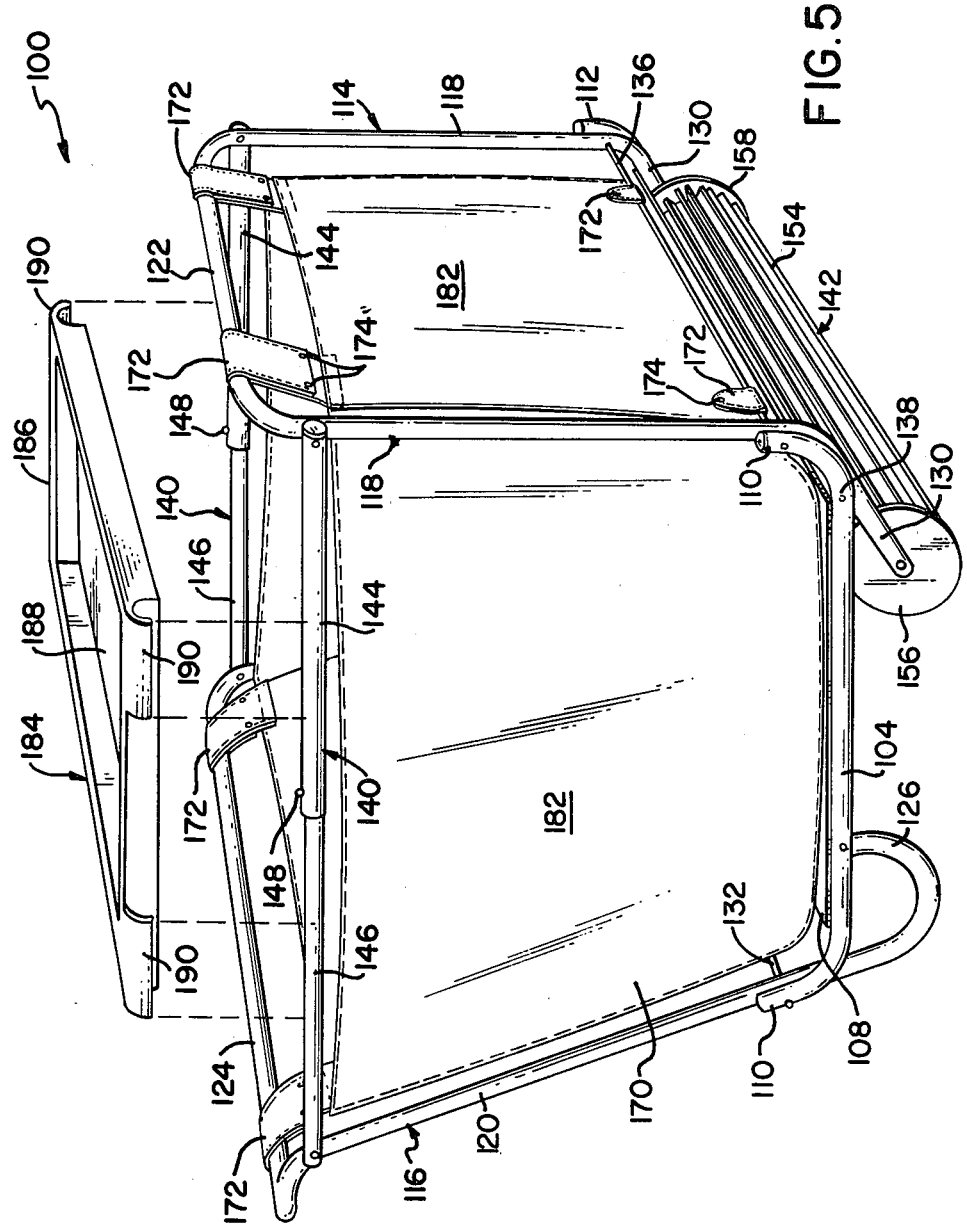
FIG. 5 is a perspective elevation of the collapsible, multi-purpose assembly as shown in FIG. 1 showing a flexible bag secured to portions of the assembly and a table arranged for engagement with the securing means.
Figure 6:
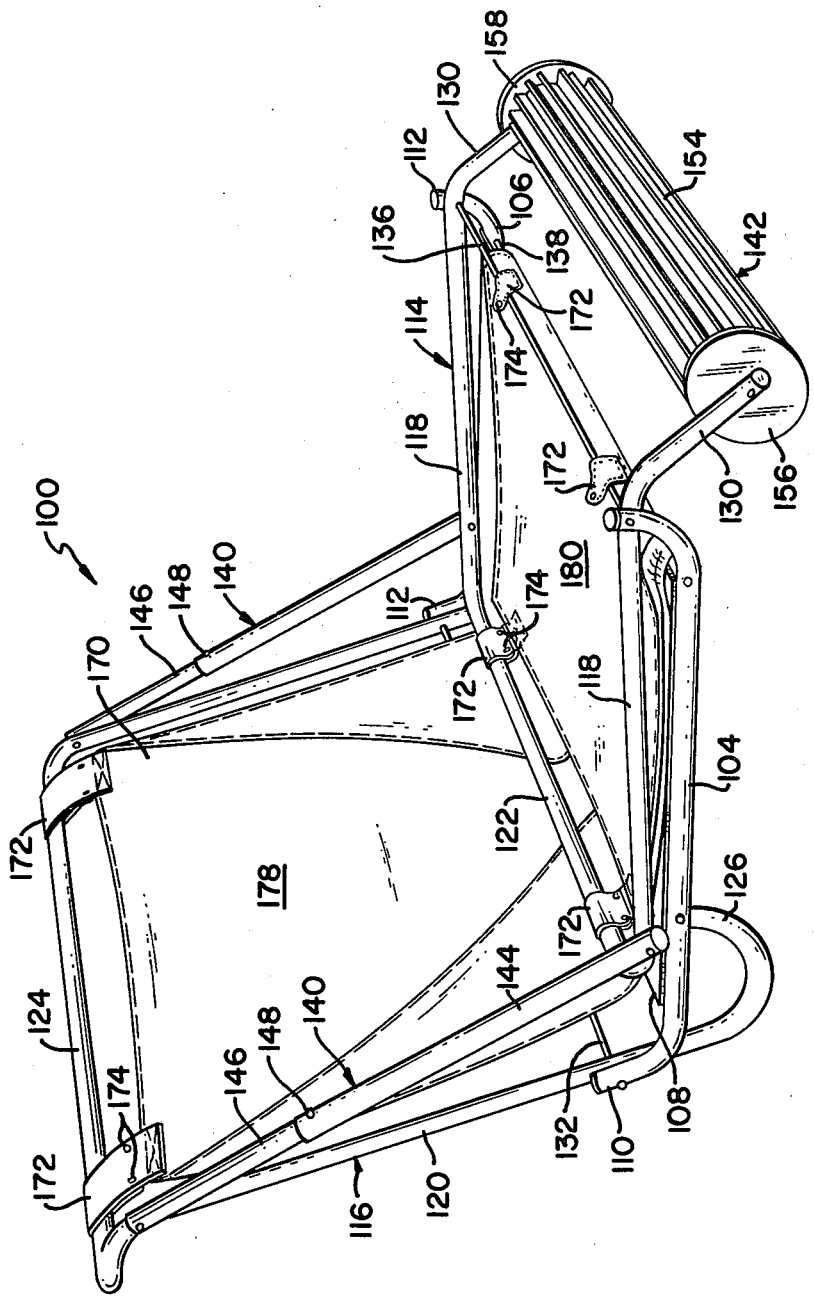
FIG. 6 is a perspective elevation of the collapsible, multi-purpose assembly as shown in FIG. 5 arranged into a portable chair.

The operation of the collapsible, multi-purpose assembly 100 in transformation from a compact folded position as shown in FIG. 7 to either a portable chair as shown in FIG. 6 or a container as shown in FIG. 5 will now be described with reference to these FIGS. Specifically with reference to FIG. 7, the assembly 100 is shown in its collapsed or folded position. In the folded position, sidewall member 114 overlies platform 108 by being pivoted about cross-shaft 136 in a counterclockwise direction. In a like manner, sidewall member 116 overlies platform 108 by being pivoted about cross-shaft 132 in a clockwise direction. Telescoping tube assemblies 140 permit sidewall members 114, 116 to be folded on top of each other by being pivotally attached to side arms 118, 120 and their collapsing from their longitudinally extended position. The assembly 100 is now arranged in a compact folded form similar to a lounge or beach chair and can be easily transported by grabbing the U-shaped hooks 126 on sidewall member 116. The assembly 100 in its collapsed position occupies a minimum of space.

Upon arrival at the picnic or beach area, the assembly 100 is removed in its collapsed or folded position as shown in FIG. 7. The assembly 100 may be transported to the desired area and subsequently arranged into a comfortable chair as shown in FIG. 6, or can be arranged into a container as shown in FIG. 5. The assembly 100 is arranged into a chair from a folded position by grabbing cross-member 124 and rotating sidewall member 116 in a counterclockwise direction about cross-shaft 132 until notch 128 engages cross-shaft 134. Sidewall member 116 is now arranged in a generally upright position with sidewall member 114 remaining overlying base 102. Sidewall member 116 and bag 170 form the back portion 178 of the chair and sidewall member 114 in conjunction with bag 170 and platform 108 form the bottom portion 180 of the chair. As sidewall member 116 is pivoted in a counterclockwise direction, the telescoping tube assemblies 140 pivot about pin 168 and is longitudinally extended from its collapsed position as shown in FIG. 7.

The assembly 100 in the form of the chair as shown in FIG. 6 can be easily converted into the form of a container as shown in FIG. 5. The assembly 100 is transformed into a container by grasping cross-member 122 and pivoting sidewall member 114 about cross-shaft 136 in a clockwise direction until straight end segments 130 of side arms 118 engage cross-shaft 138. As sidewall member 114 is pivoted, telescoping tube assemblies 140 likewise pivot about pins 168 and longitudinally extended from their position as shown in FIG. 6. As the sidewall member 114 approaches a general upright position, telescoping tube assemblies 140 are locked in position by spring button lock 148 engaging opening 150 as shown in FIG. 2. Telescoping tube assemblies 140 secure sidewall members 114, 116 in a spaced apart relationship such that the sidewall members, telescoping tube assemblies and bag 176 form the side wall portions 182 of the container as shown in FIG. 5.

To fold the assembly 100 from the container as shown in FIG. 5, spring lock button 148 is depressed on telescoping tube assemblies 140 while urging sidewall members 114, 116 pivotally towards each other. As sidewall members 114, 116 pivot towards each other, telescoping tube assemblies 140 pivot about pins 168 and longitudinally collapse allowing the sidewall members to be folded respectively over base 102 to form either the chair as shown in FIG. 6 or a collapsed assembly as shown in FIG. 7.

In accordance with an additional feature of the present invention, a removable snap on table top 184 is provided. The table top 184 includes a retaining lip 186 to define a table surface 188. The table top 184 is secured to the assembly 100 when in the form of a container as shown in FIG. 5. Lip 186 of table top 184 is constructed to include semi-circular lugs 190 located at its four corners. Lugs 190 are constructed and arranged to engage tubular members 144, 146 of the telescoping tube assemblies 140.

In accordance with another feature of the present invention, assembly 100 is provided with a roller assembly 142 having a ribbed roller section 152 to allow the assembly, when in the form of a container, to be rolled over loose terrain such as sand and the like with a minimum of effort. Roller assembly 142 is positioned adjacent base 102 such that the total weight of the assembly 100 and its contents are distributed over the total area of the ribbed roller section 152 in contact with the sand. This total load weight distribution reduces the depth that ribbed roller section 152 settles into the sand thereby minimizing the effort required to roll assembly 100. The space between ribs 154 accommodates the sand which in turn tends to hold the ribs in place. Roller assembly 142 rotates about axle 164 as the assembly 100 is pulled across the sand. Ribs 154 provide roller assembly 142 with a uniform rolling action which avoids skids and sand from piling up in front of the roller which would inhibit its uniform rolling action.

As previously described, roller assembly 142 is provided with end caps 156, 158 having a diameter greater than the radial extent of ribs 154 and a hole 162 centrally located therein. As a result of end caps 156, 158 having a slightly larger diameter than ribs 154, the ends caps provide a smooth and vibration free rolling action for the assembly 100 on hard surfaces by avoiding contact with ribs 154. In addition, caps 156, 158 provide an axle bearing for ribbed roller section 152.

Although the invention herein has been described with reference to particular embodiments, it is to be understood that these embodiments are merely illustrative of the principles and application of the present invention. It is to be understood that numerous modifications may be made in the illustrative embodiments and other arrangements may be devised without departing from the scope of the present invention as defined by the appended claims.

What is claimed is:

1. A collapsible, multi-purpose assembly comprising a base, a pair of sidewall members each having first and second ends, said first ends of said sidewall members being pivotally connected to opposite sides of said base, a pair of securing means for securing said sidewall members in a first position and for permitting said sidewall members to be arranged into a second and third position, said securing means being connected to the second ends of said sidewall members between common sides thereof, said assembly forming a container when arranged in said first position, a chair when arranged in said second position and a collapsed assembly when arranged in said third position, and rotating means located adjacent one side of said base for moving said assembly over a desired surface, said rotating means comprising a plurality of longitudinally extending ribs arranged radially about the longitudinal axis of said rotating means.

2. The assembly as set forth in claim 1 wherein said sidewall members are arranged for pivotal movement from a generally upright position to one overlying said base.

3. The assembly as set forth in claim 2 wherein said first position includes said pair of sidewall members being in said upright position.

4. The assembly as set forth in claim 2 wherein said second position includes one of said sidewall members being in said upright position and the other sidewall member overlying said base.

5. The assembly as set forth in claim 2 further including means for restricting the pivotal movement of said sidewall members from said upright position to one other than overlying said base.

6. A collapsible, multi-purpose assembly adapted for use with a flexible member comprising a base having side supporting members for securing a platform therebetween, a pair of sidewall members each having first and second ends, said first ends of said sidewall members being pivotally connected to said side supporting members at opposite sides of said base, a pair of securing means for securing said sidewall members in a first position and permitting said sidewall members to be arranged into a second and third position, said securing means connected to the second ends of said sidewall members between common sides thereof, said assembly forming a container when said sidewall members and said securing means are arranged in a first position, a chair when arranged in a second position and a collapsed assembly when arranged in said third position, and rotating means located adjacent said base for moving said assembly over a desired surface, said rotating means comprising a plurality of longitudinally extending ribs arranged radially about the longitudinal axis of said rotating means.

7. The assembly as set forth in claim 6 wherein said first position includes said pair of sidewall members arranged in a generally upright position and secured in said upright position by said pair of securing means, said sidewall members and said securing means providing the side portions of said container.

8. The assembly as set forth in claim 6 wherein said second position includes one of said sidewall members arranged in a generally upright position to provide the back portion of said chair and the other sidewall member arranged overlying said base to provide the bottom portion of said chair.

9. The assembly as set forth in claim 6 wherein said pair of securing means include a telescoping device constructed and arranged to be longitudinally extended and collapsed in response to the pivotal movement of said sidewall members.

10. The assembly as set forth in claim 6 further including means secured to said base for restricting the pivotal movement of said pair of sidewall members.

11. The assembly as set forth in claim 6 wherein said flexible member includes a bag attached to said assembly.

12. The assembly as set forth in claim 11 wherein said bag forms the side wall portions of said container and the back and bottom portions of said chair.

13. A collapsible, multi-purpose assembly adapted for use with a flexible bag comprising an adjustable frame, said frame including a base having a pair of side supporting members and a platform attached therebetween, a pair of U-shaped members having side arms pivotally connected at one end to said supporting members at opposite sides of said platform, a pair of telescoping devices pivotally connected to the other ends of said side arms between common sides of said U-shaped member for longitudinal movement between an extended and collapsed position in response to the pivotal movement of said U-shaped members, a flexible bag secured to said frame, said frame and bag forming a chair when one of said U-shaped members is arranged in a generally upright position and the other in a folded position overlying said platform to provide the back and bottom portions of said chair, said frame and bag forming said container when said U-shaped members are arranged in a generally upright position and secured thereat by said telescoping devices being locked in said extended position between said U-shaped members to providing the side portions of said container, means secured to said base for engagement with said side arms to restrict the pivotal movement of said U-shaped members from a generally upright position to one other than in a folded position overlying said platform, and rotating means secured across the open end of one of said U-shaped members for moving said assembly over a desired surface, said rotating means comprising a plurality of longitudinally extending ribs arranged radially about the longitudinal axis of said rotating means.

14. The assembly as set forth in claim 13 wherein said telescoping devices are constructed and arranged when in said extended position to receive a cover to provide a rigid surface therebetween.

15. The assembly as set forth in claim 13 further including caps secured at either end of said rotating means, said caps having a diameter greater than the radial extent of said ribs.

16. The assembly as set forth in claim 13 wherein said bag includes straps for securing said bag to said frame.

17. The assembly as set forth in claim 13 wherein said pair of telescoping devices includes means for releasably locking said telescoping devices in said extended position.

18. The assembly as set forth in claim 13 wherein said rotating means are constructed and arranged to be moveable with one of said U-shaped members to a position underlying said platform when said U-shaped member is arranged in a generally upright position.

* * * * *